United States Patent [19]

Page

[11] Patent Number: 5,060,646

[45] Date of Patent: Oct. 29, 1991

[54] CLOSED SYSTEM FOR INVOLUNTARY MEDICAL ASPIRATION AND VENTILATION, AND METHOD

[75] Inventor: Larry E. Page, Salt Lake City, Utah

[73] Assignee: Ballard Medical Products, Draper, Utah

[21] Appl. No.: 580,247

[22] Filed: Sep. 10, 1990

[51] Int. Cl.$^5$ .............................................. A61M 16/00

[52] U.S. Cl. ............................ 128/207.14; 128/200.26

[58] Field of Search ....................... 128/207.14, 207.15, 128/207.16, 200.26; 604/281

[56] References Cited

U.S. PATENT DOCUMENTS

| | | | |
|---|---|---|---|
| 111,503 | 4/1871 | Dinnen . | |
| 274,447 | 3/1883 | Kennish . | |
| 580,574 | 4/1897 | Fowler | 251/100 |
| 1,220,549 | 12/1914 | Schellberg . | |
| 1,463,735 | 7/1923 | Varrieur | 251/100 |
| 1,672,114 | 6/1928 | Crow . | |
| 1,917,981 | 7/1933 | Kindl | 251/95 |
| 1,944,553 | 1/1934 | Freund | 128/229 |
| 2,187,586 | 1/1940 | Hopper | 128/224 |
| 2,212,334 | 8/1940 | Wallerich | 604/780 |
| 2,564,809 | 12/1947 | Levene | 128/240 |
| 2,568,566 | 9/1951 | Sokolik | 128/240 |
| 2,584,450 | 2/1952 | Holt et al. | 128/203 |
| 2,705,959 | 4/1955 | Elmore | 128/351 |
| 2,753,040 | 7/1956 | Twyman | 251/342 |
| 2,893,395 | 7/1959 | Buck | 128/349 |
| 2,895,708 | 7/1959 | Palumbo | 251/77 |
| 2,912,982 | 11/1959 | Baraky | 128/912 |
| 2,924,232 | 2/1960 | Michaels | 137/315 |
| 2,937,643 | 5/1960 | Elliot | 128/214 |
| 3,017,880 | 1/1962 | Brook | 128/29 |
| 3,039,463 | 6/1962 | Dickey, Jr. et al. | 128/912 |
| 3,070,132 | 12/1962 | Sheridan | 604/280 |
| 3,104,090 | 3/1963 | Callahan, Jr. | 251/278 |
| 3,175,357 | 3/1965 | Hammond | 128/207.14 |
| 3,207,472 | 9/1965 | Selianm | 251/331 |
| 3,322,126 | 5/1967 | Rosch et al. | 128/351 |
| 3,335,723 | 8/1967 | Waldman, Jr. | 128/214.4 |
| 3,361,629 | 1/1968 | Kuhn | 604/281 |
| 3,444,860 | 5/1968 | Harrell | 128/349 |
| 3,461,877 | 8/1969 | Morch | 128/351 |
| 3,485,234 | 12/1969 | Stevens | 604/281 |
| 3,508,354 | 4/1970 | Sheridan | 604/280 |
| 3,517,669 | 6/1970 | Buono et al. | 128/276 |
| 3,593,713 | 7/1971 | Bogoff | 128/246 |
| 3,595,445 | 7/1971 | Burford et al. | 222/213 |

(List continued on next page.)

FOREIGN PATENT DOCUMENTS

| | | | |
|---|---|---|---|
| 241457 | 10/1974 | Australia . | |
| 112668 | 7/1984 | European Pat. Off. . | |
| 245607 | 3/1987 | European Pat. Off. . | |
| 3307517 | 9/1984 | Fed. Rep. of Germany . | |
| 560910 | 7/1924 | France . | |

(List continued on next page.)

OTHER PUBLICATIONS

"Side Eye Position", a report concerning suction kits and catheters; Davol Products (undated).

CATHMARK, item of literature (Date unknown).

Superior Brochure "Continuous Ventilating Suction System" (undated).

Superior Advertisement "Infection Control Valve Suction Catheter" (undated).

Suctioning of left bronchial trec in the intubated adult, *Care Medicine*, Kamiaru; 092 (Date Unknown).

Evaluation of Selective Bronchial Suctioning Techniques Used for Infants and Children, Anesthesiology, 48:379–380 (date unknown).

(List continued on next page.)

*Primary Examiner*—Edgar S. Burr
*Assistant Examiner*—Aaron J. Lewis
*Attorney, Agent, or Firm*—Lynn G. Foster

[57] ABSTRACT

A novel closed system aspirating and ventilating apparatus, and related methods, for respiratory therapy, which comprises a novel ventilating and aspirating closed system distal fitting structure found to be particularly useful in a neonatal context in reducing the risk of premature interruption in ventilation due to patient movement or the like which displaces and/or dislodges distal fitting structure.

17 Claims, 4 Drawing Sheets

U.S. PATENT DOCUMENTS

| | | | |
|---|---|---|---|
| 3,605,750 | 9/1971 | Sheridan et al. | 604/280 |
| 3,612,038 | 10/1971 | Halligan | 604/281 |
| 3,614,057 | 10/1971 | Hospe | 251/251 |
| 3,628,532 | 12/1971 | Magrath | 128/145.8 |
| 3,633,758 | 1/1972 | Moise | 604/281 |
| 3,719,737 | 3/1973 | Vaillancourt et al. | 604/281 |
| 3,730,179 | 5/1973 | Williams | 128/145.5 |
| 3,734,094 | 5/1973 | Calinog | 128/2.06 |
| 3,757,771 | 9/1973 | Ruogg et al. | 128/2.1 |
| 3,774,604 | 11/1973 | Danielsson | 128/214.6 |
| 3,788,305 | 1/1974 | Schreiber | 128/2 F |
| 3,810,471 | 5/1974 | Truhan | 128/276 |
| 3,825,001 | 7/1974 | Bennet et al. | 128/214.4 |
| 3,885,561 | 5/1975 | Cami | 604/280 |
| 3,894,540 | 7/1975 | Bonner, Jr. | 128/349 R |
| 3,902,500 | 9/1975 | Dryden | 128/207.14 |
| 3,906,954 | 9/1975 | Baehr | 128/305 |
| 3,911,919 | 10/1975 | Raitte | 128/276 |
| 3,935,857 | 2/1976 | Co | 604/281 |
| 3,937,220 | 2/1976 | Coyne | 604/119 |
| 3,991,762 | 11/1976 | Radford | 128/276 |
| 3,999,554 | 12/1976 | Kim et al. | 128/350 R |
| 4,015,336 | 4/1977 | Johnson | 32/33 |
| 4,022,219 | 5/1977 | Basta | 128/351 |
| 4,027,659 | 6/1977 | Slingluff | 604/280 |
| 4,036,210 | 7/1977 | Campbell et al. | 128/2 F |
| 4,047,527 | 9/1977 | Kelsen | 128/229 |
| 4,050,667 | 9/1977 | Kossett | 604/281 |
| 4,052,990 | 10/1977 | Dodgson | 128/207.14 |
| 4,062,363 | 12/1977 | Bonner, Jr. | 128/349 |
| 4,081,176 | 3/1978 | Johnson | 251/342 |
| 4,119,101 | 10/1978 | Igich | 128/351 |
| 4,122,591 | 10/1978 | Kramann et al. | 29/157 R |
| 4,152,017 | 5/1979 | Abramson | 128/207.14 |
| 4,168,703 | 9/1979 | Kenigsberg | 128/748 |
| 4,170,996 | 10/1979 | Wu | 128/349 R |
| 4,178,936 | 12/1979 | Newcomb | 128/349 B |
| 4,193,406 | 3/1980 | Jinotti | 128/204.18 |
| 4,212,300 | 7/1980 | Meals | 128/276 |
| 4,214,593 | 7/1980 | Imbruce et al. | 128/748 |
| 4,225,371 | 9/1980 | Taylor et al. | 156/652 |
| 4,235,232 | 11/1980 | Spaven et al. | 128/214.4 |
| 4,240,417 | 12/1980 | Holever | 128/912 |
| 4,245,636 | 1/1981 | Sparks et al. | 128/214 R |
| 4,256,099 | 3/1981 | Dryden | 128/200.26 |
| 4,275,724 | 6/1981 | Behrstock | 604/281 |
| 4,300,550 | 11/1981 | Gandi et al. | 128/207.18 |
| 4,324,239 | 4/1982 | Gordon et al. | 128/274 |
| 4,326,520 | 4/1982 | Alley | 128/214.4 |
| 4,327,723 | 5/1982 | Frankhouser | 128/214.4 |
| 4,327,735 | 5/1982 | Hampson | 128/348 |
| 4,356,610 | 11/1982 | Hon et al. | 29/157 |
| 4,356,824 | 11/1982 | Vazquez | 128/350 R |
| 4,363,323 | 12/1982 | Geiss | 604/281 |
| 4,364,394 | 12/1982 | Wilkinson | 604/96 |
| 4,387,879 | 6/1983 | Tauschinski | 251/149.1 |
| 4,397,442 | 8/1983 | Larkin | 251/342 |

(List continued on next page.)

FOREIGN PATENT DOCUMENTS

| | | | |
|---|---|---|---|
| 993481 | 10/1951 | France | 19/1 |
| WO810267 | 10/1981 | PCT Int'l Appl. . | |
| WO8201824 | 11/1981 | PCT Int'l Appl. . | |
| WO870552 | 9/1987 | PCT Int'l Appl. . | |
| WO880338 | 5/1988 | PCT Int'l Appl. . | |
| 109996 | 6/1984 | U.S.S.R. . | |
| 114862 | 4/1985 | U.S.S.R. . | |

OTHER PUBLICATIONS

ACMI Catalog, pp. 31-35, Copyright 1960.

Prevention of Hypoxic Complication, 1968.

"Sterile Suctioning with Bare Hands"; The Nation's Hospitals & Diagnostic Laboratories, Fall 1975.

Comparison of Tracheobronchial Suction Catheters in Humans, *Chest*, vol. 69, pp. 179-181, Feb. 1976.

Selective Tracheobronchial Aspiration, *Thorax*, 32, 346-348, 1977.

Efficon Trach Care Brochure and Price List, Apr. 15, 1978.

A New Controllable Suction Catheter for Blind Cannulatin of the Main Stem Brochi, *Critical Care Medicine*, vol. 6, No. 5, Sep.-Oct. 1978.

Disposable Suction Catheter, *Nursing*, May 1979.

Evaluation of Selective Brochial Suctioning in the Adult, *Critical Care Medicine*, vol. 8, No. 12, 1980.

Design and Function of Tracheal Suction Catheters, 1982.

The New NL Tracheal Suction Catheter, *Anesthesiology*, 1982.

Selective Bronchial Suctioning in the Adult Using a Curved-Tipped Catheter with a Guide Mark, *Critical Care Medicine*, vol. 10, No. 11, Nov. 1982.

Device for Determining Location of an Endotracheal Catheter Tip, *Critical Care Medicine*, vol. 12, No. 2, Feb. 1984.

The Bear NVM-1 Neonatal Volume Monitor, 1986 (citing U.S. Pat. No. 4,363,238).

U.S. PATENT DOCUMENTS

| | | | |
|---|---|---|---|
| 4,406,656 | 9/1983 | Hattler et al. | 604/280 |
| 4,414,999 | 11/1983 | Basta | 137/240 |
| 4,426,062 | 1/1984 | Bowrom | 251/7 |
| 4,440,378 | 4/1984 | Sullivan | 251/117 |
| 4,451,257 | 5/1984 | Atchley | 604/119 |
| 4,454,887 | 6/1984 | Kruger | 128/772 |
| 4,456,223 | 6/1984 | Ebling | 251/342 |
| 4,457,487 | 7/1984 | Steigerwald | 251/117 |
| 4,459,982 | 7/1984 | Fry | 128/204.23 |
| 4,469,483 | 9/1984 | Becker et al. | 128/DIG. 21 |
| 4,487,600 | 12/1984 | Brownlie | 604/35 |
| 4,497,468 | 2/1985 | Hubbard et al. | 251/117 |
| 4,502,482 | 3/1985 | DeLuccia et al. | 128/207.15 |
| 4,508,533 | 4/1985 | Abramson | 604/35 |
| 4,512,765 | 4/1985 | Muto | 604/119 |
| 4,534,542 | 8/1985 | Russo | 251/342 |
| 4,536,180 | 8/1985 | Johnson | 604/268 |
| 4,537,387 | 8/1985 | Danby et al. | 251/331 |
| 4,543,089 | 9/1985 | Moss | 604/93 |
| 4,573,965 | 3/1986 | Russo | 604/30 |
| 4,573,979 | 3/1986 | Blake | 604/240 |
| 4,574,173 | 3/1986 | Bennett | 219/10.53 |
| 4,595,005 | 6/1986 | Jinotti | 128/203.24 |
| 4,596,564 | 6/1986 | Spetzler | 604/281 |
| 4,601,713 | 7/1986 | Fuqua | 604/280 |
| 4,607,635 | 8/1986 | Heyden | 128/207.15 |
| 4,613,323 | 9/1986 | Norton et al. | 604/43 |
| 4,619,643 | 10/1986 | Bai | 604/43 |
| 4,632,112 | 12/1986 | Matthews | 128/305.3 |
| 4,637,389 | 1/1987 | Heyden | 128/207.15 |
| 4,652,255 | 3/1987 | Martinez | 604/27 |
| 4,655,752 | 4/1987 | Honkanen et al. | 604/256 |
| 4,670,009 | 6/1987 | Bullock | 604/280 |
| 4,671,291 | 6/1987 | Wilson | 604/280 |
| 4,673,393 | 6/1987 | Suzuki et al. | 604/167 |
| 4,676,778 | 6/1987 | Nelson, Jr. | 604/45 |
| 4,681,564 | 7/1987 | Landreneau | 604/97 |
| 4,692,146 | 9/1987 | Hilger | 604/93 |
| 4,696,296 | 9/1987 | Palmer | 128/207.16 |
| 4,696,305 | 9/1987 | von Berg | 128/673 |
| 4,703,775 | 11/1987 | Paatrone | 137/625.3 |
| 4,704,111 | 11/1987 | Moss | 604/280 |
| 4,710,181 | 12/1987 | Fuqua | 604/280 |
| 4,735,606 | 4/1988 | Davison | 604/28 |
| 4,738,666 | 4/1988 | Fuqua | 604/280 |
| 4,750,902 | 6/1988 | Wuchinich et al. | 604/22 |
| 4,753,640 | 6/1988 | Nichols et al. | 604/247 |
| 4,781,678 | 11/1988 | de Couet et al. | 604/45 |
| 4,795,439 | 1/1989 | Guest | 604/43 |
| 4,808,156 | 2/1989 | Dean | 604/43 |
| 4,813,429 | 3/1989 | Eshel et al. | 128/736 |
| 4,821,714 | 4/1989 | Smelser | 128/207.14 |
| 4,821,883 | 4/1989 | Miller | 206/495 |
| 4,825,859 | 5/1989 | Lambert | 128/202.16 |
| 4,834,726 | 5/1989 | Lambert | 604/281 |
| 4,838,255 | 6/1989 | Lambert | 128/202.16 |
| 4,846,791 | 7/1989 | Hattler et al. | 604/43 |
| 4,938,741 | 7/1990 | Lambert | 604/19 |

CLOSED SYSTEM FOR INVOLUNTARY MEDICAL ASPIRATION AND VENTILATION, AND METHOD

FIELD OF THE INVENTION

The present invention relates generally to involuntary ventilation of the respiratory system of a medical patient and involuntary aspiration of secretions from the lungs of the patient and more particularly to a novel closed system ventilating and aspirating apparatus, and related method, the apparatus comprising a simplified distal fitting structure by which both (a) delivery of an oxygenating gas is achieved with little risk of inadvertent premature termination of such delivery and (b) selective introduction of an aspirating catheter tube into the respiratory system of the patient for evacuation of accumulated secretions from the lungs of the patient.

PRIOR ART

Respiratory distress frequently occurs in medical patients and is often exacerbated in infants and small children experiencing respiratory problems, when both ventilation and aspiration of secretions are involved. Such procedures are commonplace in premature infants. When an infant or small child is unable to breathe adequately on its own, intubation and involuntary ventilation is provided, typically via an endotracheal tube. This requires periodic, involuntary removal, via a small suction catheter tube, of secretions which accumulate in the lungs. It is important that injury to or penetration of the lungs with the suction catheter tube not occur. Precise control in placement of the suction catheter tube is, therefore, of great concern because of the risk of trauma, and injury, during placement. Bulky aspirating and ventilating paraphernalia can incumber movement of the child and be the source of injury to the child, for example, if caught in the bed clothing of the child.

None of the neonatal ventilating/aspirating devices proposed previously fully addresses and entirely solves the problems associated with proper intubation care, especially where infants and small children are involved. Inadvertent separation of distal fitting structure of aspirating and ventilating equipment, due to patient movement and the like, has continued to be a problem.

The most relevant, known aspirating/ventilating related patents are U.S. Pat. Nos. 3,991,762; 4,569,344 and 4,838,255. These do not per se address the aforementioned needs, especially in respect to neonates.

Neither the related patents nor the related literature adequately address simplification of the distal fitting structure of a closed system ventilating and aspirating apparatus, including those especially intended for neonates, so that the aspirating catheter tube can readily be advanced therethrough as desired and ventilation is facilely achieved with minimum risk of premature interruption of ventilation by inadvertent displacement of the distal fitting structure due, for example, to patient movement.

BRIEF SUMMARY AND OBJECTS OF THE PRESENT INVENTION

In brief summary, the present invention is intended to overcome or substantially alleviate the aforementioned problem and comprises a novel closed system aspirating and ventilating apparatus, and related methods, for respiratory therapy, which is particularly useful in a neonatal context in reducing the risk of premature interruption in ventilation due to patient movement or the like which displaces and/or dislodges distal fitting structure.

It is a primary object of the present invention to overcome or substantially alleviate the aforementioned problem in the provision of a novel closed system ventilating and aspirating apparatus, and related methods.

It is also an important object to provide a novel closed system aspirating and ventilating apparatus, and related methods, which greatly reduce the risk of premature interruption in ventilation due to inadvertent displacement and/or dislodgement of distal fitting structure thereof.

It is a paramount object of the present invention to provide a novel apparatus for respiratory therapy, which is particularly useful in a neonatal context, and a related method.

A further object of significance is the provision of a novel fitting near the distal end of a closed system aspirating/ventilating apparatus which has low dead space, alleviates the incidence of inadvertent disconnection, premature interruption in ventilation and trauma induced by unintended displacement of the fitting and reliably accommodates aspiration and ventilation.

These and other objects and features of the present invention will be apparent from the detailed description taken with reference to the accompanying drawings.

DETAILED DESCRIPTION OF THE ILLUSTRATED EMBODIMENT

Removing secretions from the tracheobronchial tree is an integral part of the care given to patients who are intubated and receiving mechanical or other artificial ventilation. Secretions can be excessive in some respiratory disorders and constitute a serious threat to persons having such respiratory disorders. Secretions are of particular concern with neonates. The presence of an endotracheal tube is a hindrance to the patient's efforts to clear secretions through natural coughing. Suction catheters are used to clear such secretions from the patients' airway.

A closed system aspirating/ventilating apparatus can be attached to the proximal, exposed end of the patient's indwelling endotracheal tube and included as part of an overall ventilation circuit. A suction catheter may be enclosed within a plastic sleeve to eliminate or minimize contamination thereof. As the patient requires artificial removal of secretions, the suction catheter is grasped through the plastic sleeve and advanced through a fitting of the ventilating device into the patient's airway and thence into a selected lung of the patient. Suction is thereafter applied to remove the secretions. The other lung may likewise be aspirated. Secretions are thus drawn into the lumen of the catheter tube and thus removed from the patient's respiratory system. The catheter tube is subsequently withdrawn into the plastic bag.

Open systems for ventilating and aspirating are also known. This sometimes comprises a distal elbow fitting which, on an open basis, accommodates aspiration using a separate suction catheter.

Figure 1:
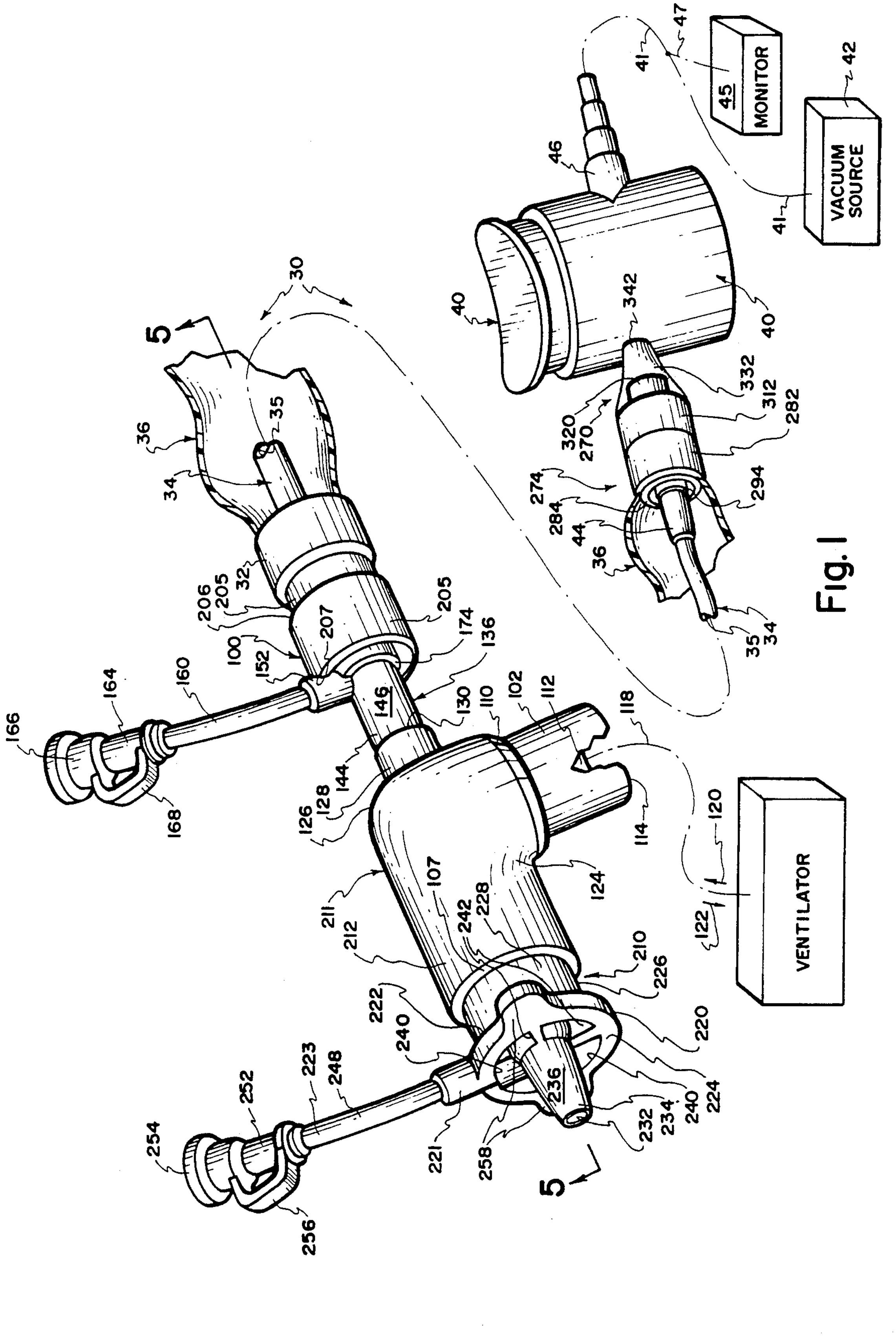
FIG. 1 is a perspective representation of a single lumen catheter ventilating/aspirating apparatus embodying the present invention.

The present invention is directed toward an improved closed system ventilating/aspirating apparatus, and related methods. Reference is now made to the drawings wherein like numerals are used to designate like parts throughout. A presently preferred integrated ventilator/aspirating mechanism, generally designated 30, is illustrated in FIG. 1. Mechanism 30 embodies the principles of the present invention. The closed system ventilating/aspirating mechanism 30, as best shown in FIG. 1, broadly comprises a distal adaptor 210, a closed system L-shaped intermediate hollow connector or hollow ventilating elbow 211, a linear male fitting 100, a collar 32, a collapsible plastic sleeve or envelope 36, a suction catheter tube 34, a fitting 274 which receives a collar 282, an observation chamber 270 and a vacuum valve 40. The centrally disposed, axially directed suction catheter tube 34 is illustrated as being contained within the collapsible envelope 36. The envelope 36 may be formed of synthetic resinous film in sleeve form, which is force-fit connected to fittings 100 and 274, respectively, by collars 32 and 282.

The catheter tube 34 is adapted to be displaced snugly through the fitting 100 and adaptor 210, via elbow fitting 211, and is rigidly anchored to the fitting 274 at the interior of hollow projection 44.

The suction control valve 40 comprises a stepped hollow proximal projection 46 by which the valve 40 is connected in fluid communication via a hollow tube 41 with a conventional source 42 of negative pressure or vacuum, such as a conventional hospital suction system. Preferably, the control valve 40 is preferably identical or substantially identical to the control valve described in U.S. Pat. No. 4,569,344. No further description is believed to be necessary in regard to the control valve 40 and the indicated adjacent structure, the disclosure of U.S. Pat. No. 4,569,344 being incorporated herein by reference.

Figure 3:
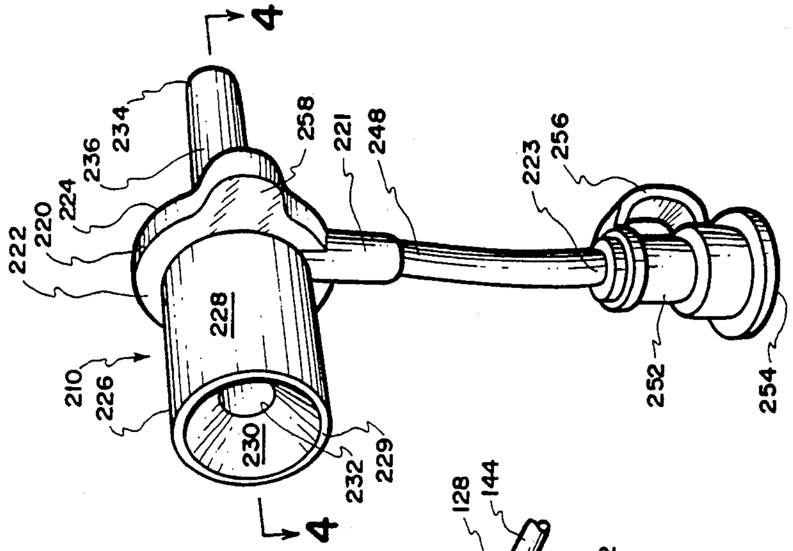
FIG. 3 is an enlarged perspective of the inverted distal adaptor of FIG. 2.
Figure 2:
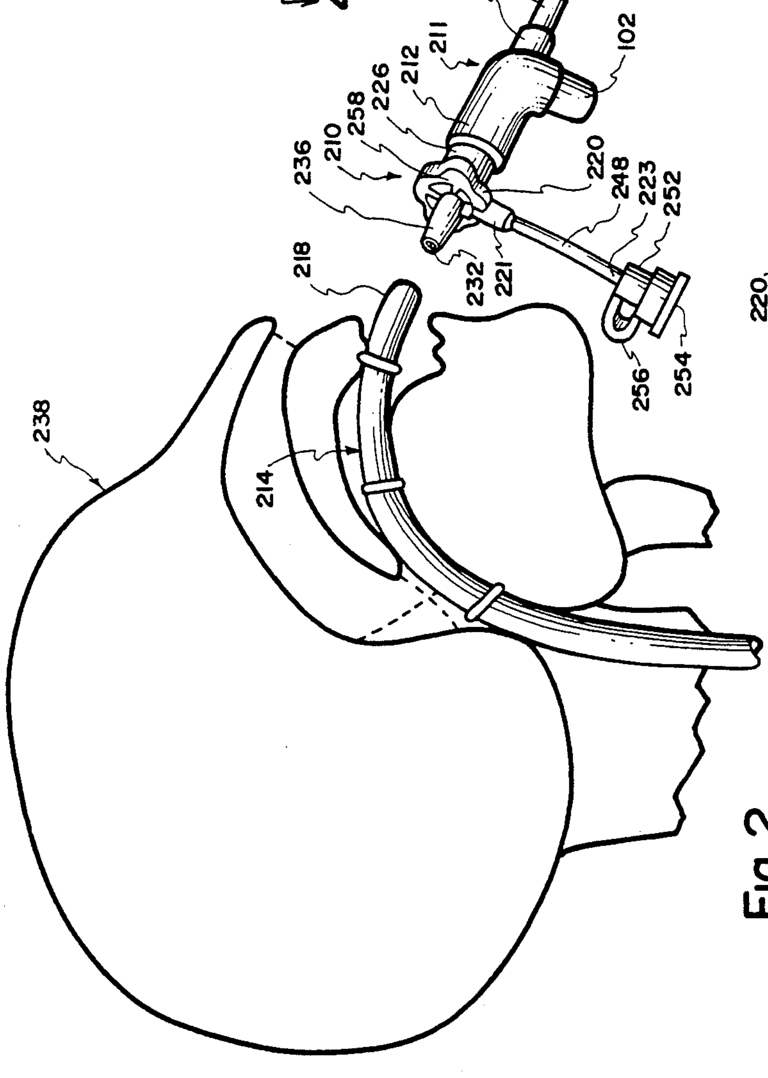
FIG. 2 is an exploded fragmentary perspective of the distal end of the apparatus of FIG. 1 showing the distal adaptor thereof inverted in respect to FIG. 1 and interposed between an exposed fitting of an indwelling endotracheal tube and an elbow of the aspirating or aspirating/ventilating apparatus.
Figure 4:
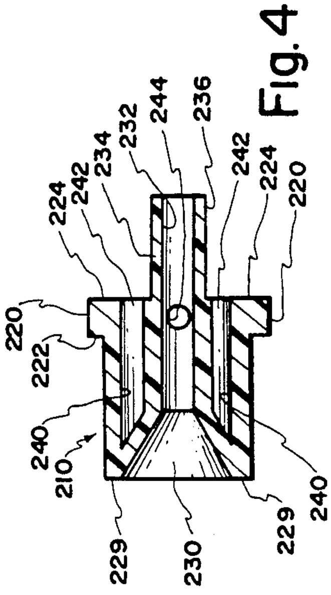
FIG. 4 is a cross-section taken along lines 4—4 of FIG. 3.

Reference is now made to FIGS. 2 through 4 which illustrate the adaptor 210. Adaptor 210 is intended to be force-fit interposed between an exposed proximal end 218 of indwelling endotracheal respiratory tube 214 and the remainder of the aspirating apparatus or ventilating-/aspirating apparatus 30 thereby providing a first connector to the indwelling endotracheal respiratory tube. Specifically, the proximal end of the adaptor 210 is illustrated as being interconnected in force-fit relation with the elbow 211 which provides an intermediate connection between adaptor 210 and a cylindrical wall 144 of an exposed distal portion 136 of fitting 100, described in detail later. This connection is illustrated at female distal end 212 of ventilating elbow fitting 211 in FIGS. 1 and 2.

The structure and placement in patient 238 of the endotracheal tube 214, illustrated in FIG. 2, is conventional and leaves the proximal end 218 of tube 214 exposed.

The adaptor 210 is disclosed in U.S. Pat. No. 4,838,255 and is best shown in FIGS. 3 and 4, the orientation of which is the reverse of FIG. 2. The adaptor 210 comprises a central exposed radial flange 220 which defines opposed shoulders 222 and 224. The flange 220 merges integrally with a rearward extension 226, which defines a cylindrical exterior exposed proximal surface 228 to be received within the bore of female end 212 of fitting 211 in snug, force/fit, air-tight relation. The proximal extension 226 comprises a trailing blunt edge 229, which merges into a conically-shaped counterbore 230, which in turn emerges with a central axially-directed, catheter tube receiving bore 232.

The adaptor 210 further comprises a forwardly directed distal male tip 234 through which the bore 232 also axially passes. The purpose of the tapered counterbore 230 is to deflect the leading end of the suction catheter tube 34 associated with the adaptor 210 so as to direct the tip into and through the central bore 232 when the tube 34 is being manually displaced into the respiratory system. The bore 232 is sized and shaped so as to easily receive the suction catheter tube 34 when the same is co-axially advanced therethrough and to accommodate a force-fit union between the surface 236 and the interior of the exposed end 218 of the endotracheal tube 214.

The exterior surface 236 of the male tip 234 is forwardly divergently tapered and otherwise sized and shaped to be snugly received in air-tight relation within the exposed end 218 of the endotracheal tube 214, whereby the suction catheter tube 34 passing through the bore 232 of the fitting 210 will be caused to be directed into the hollow interior of the endotracheal tube 214 and thence into the respiratory system of the patient 238.

The proximal extension 226 comprises cavities 240 to eliminate use of unnecessary synthetic resinous material when the adaptor 210 is preferably formed as one piece using injection molding techniques. For strength, however, radial flanges 242 exist between the cavities 240.

The axial bore 232 is intersected openly by transverse bore 244 (FIG. 4). The bore 244 is formed in the flange 220 and a hollow boss 221. The tube 248 is integrally connected to the boss 221 so that bore 244 and the hollow of tube 248 are aligned to accommodate selective liquid flow. The hollow female fitting 252 is integrally connected to end 223 of tube 248 and is normally closed at its proximal end by a press-fit, manually operable, cap 254 integrally connected to the female fitting 252 by a tether 256.

With the endotracheal tube 214 indwelling, the adaptor 210 press-fit into the exposed end 218 of the endotracheal tube, the aspirating apparatus 30 comprising fitting 212 secured to the adaptor 210 and the suction catheter tube 34 of the aspirating apparatus withdrawn, medical personnel can selectively open the cap 254 and selectively inject a lavage solution of proper makeup, quantity and dilution through the female fitting 254, the hollow interior of the tube 248, the hollow 244 of boss 221, the bore 232 and thence down the endotracheal tube 214 into the lungs of the patient for purposes of loosening accumulated secretions in the lungs. This accommodates subsequent removal of the loosened secretions via the mentioned suction catheter tube 34 when appropriately inserted into the lungs of the patient and subjected to vacuum pressure.

Figure 5:
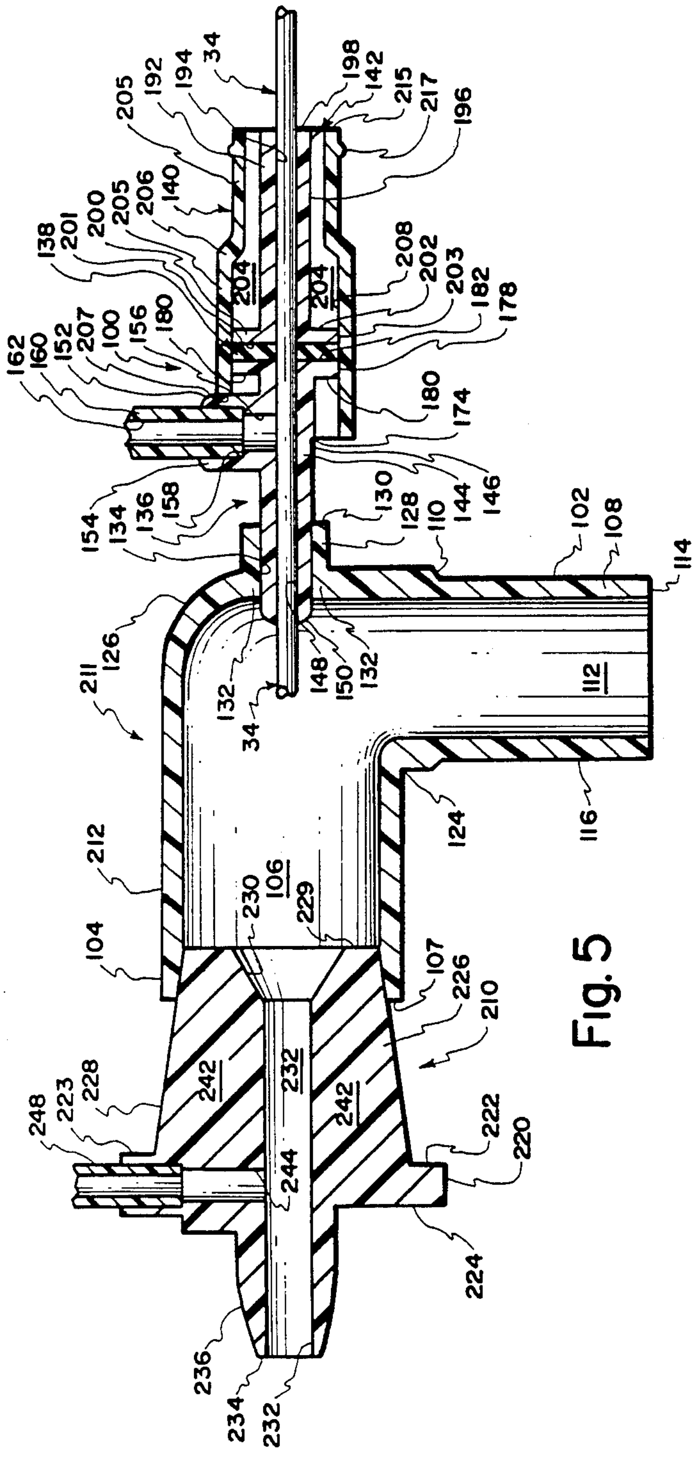
FIG. 5 is an enlarged cross-section taken along lines 5—5 of FIG. 1.

The flange 220 is illustrated as comprising opposed outwardly directed tabs 258, sized and shaped so that the adaptor 210 may be easily manually manipulated. As seen in FIGS. 1 and 2, elbow ventilating fitting 211 provides an influent and effluent ventilating pathway for respiratory gases and comprises axially-directed female distal hollow ventilating barrel 212 which provides a relatively large distal chamber and port and transversely-directed proximal hollow ventilating barrel 102 which provides a relatively large side chamber and port. Barrel 212 comprises a distal hollow ventilating barrel wall 104. Restated barrel 212 is defined by a relatively thin cylindrical wall 144, illustrated as being of uniform thickness and defining uniform inside and outside diameters. The wall 104 of barrel 212 defines a hollow axial ventilating passageway 106 into which the proximal end 226 of adaptor 210 is force-fit inserted into retained air-tight relation, as illustrated in FIGS. 1 and 5.

Barrel 102 is oppositely aligned with closed cylindrical wall 104 and comprises a thin transversely directed hollow cylindrical ventilating barrel wall 108, illustrated as being of uniform thickness below exposed diagonal shoulder 110. Thus, barrel 108 defines a transverse ventilating passageway 112 which merges with axial ventilating passageway 106 of barrel 212. Barrels 102 and 212 respectively end in blunt edges 114 and 107. Barrel 102 also comprises an external surface 116 of uniform diameter, sized for press-fit reception of a conventional length of ventilating tubing, diagrammatically illustrated as 118 in FIG. 1, by which ventilating fluid (gas) from conventional ventilator 54 is delivered to passageway 112.

Thus, the ventilating cycle which involves influent delivery of ventilating fluid (gas and/or oxygen) from the ventilator 54, first drives the fluid (gas) in the direction indicated by arrow 120 in FIG. 1, through tubing 118, passageways 112 and 106 of the hollow, L-shaped elbow fitting 211 and passageway 232 of the adaptor 210 into the respiratory system of the patient 238 (FIG. 2) via the hollow interior of the endotracheal tube 214. When the delivery stroke is completed, the ventilator 54 exhausts gas from the lungs of the patient in the reverse or effluent direction as indicated by arrow 122 in FIG. 1.

Barrel 212 integrally merges through 90 degrees with barrel 102 of elbow fitting 211 at a 45-degree angle defined, in part, by inside corner 124 and outside corner 126, respectively. The fitting 211 is preferably formed through injection molding using conventional techniques from rigid synthetic resinous material of a suitable medical grade. It may be transparent to permit observation of the interior thereof.

As seen clearly in FIG. 5, wall 108 adjacent to outside corner 126 is interrupted by a proximally-directed, axially-extending boss or small proximal port defining structure 128, which comprises a hollow cylindrical wall which ends in a blunt annular edge 130 and provides a small proximal port. Boss 128 is preferably formed integrally as one piece with the remainder of fitting 211 and, accordingly, merges at annular rounded corner 132 with wall 108. The boss 128 defines at interior wall surface 134 a circular opening into passageway 106. The diameter of the opening formed by interior wall surface 134 is of a predetermined amount defining a small proximal port at 134 for purposes yet to be explained. Nevertheless, the overall purpose of the opening defined by interior wall surface 134 is to receive in secured, force-fit relation the distal end of more proximal fitting 100 which in combination with catheter 34 comprises an aspirating structure or assembly.

Figure 6:
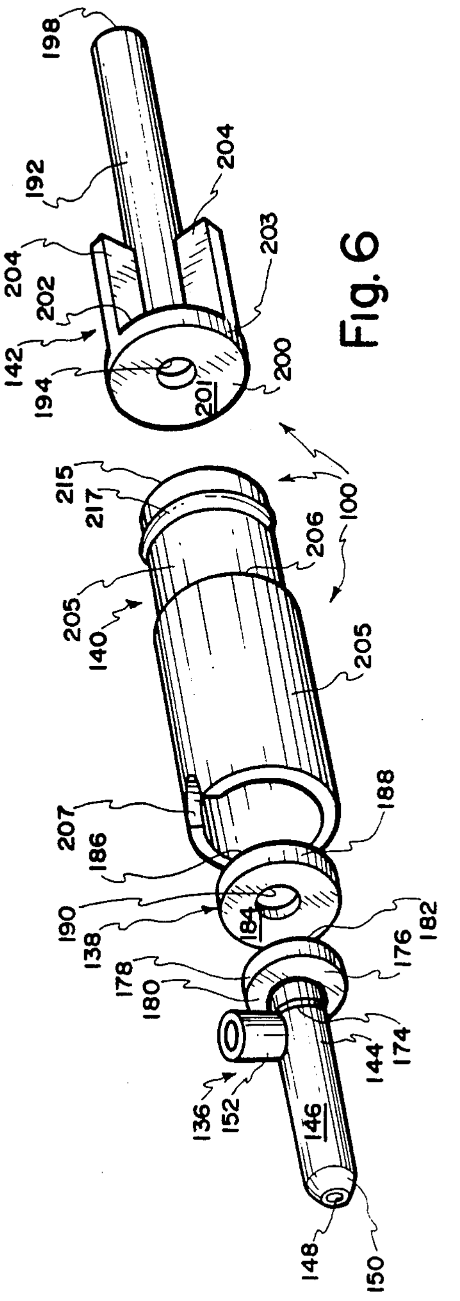
FIG. 6 is a fragmentary exploded perspective of the distal end of the apparatus of FIG. 1, with the adaptor and elbow removed.

With particular reference to FIGS. 5 and 6, fitting 100 will now be described in detail. As seen in FIG. 6, fitting 100 comprises the exposed distal portion, generally designated 136, and interior rubber or elastomeric disk, generally designated 138, an exterior exposed proximal housing, generally designated 140, and an interior proximal portion, generally designated 142. The portion 136 is a proximal male fitting in respect to the L-shaped barrel 212. Male proximal fitting 136 comprises a male leading end 150.

Exposed distal portion 136 comprises the generally cylindrical wall 144, which comprises an external generally cylindrical surface 146 and a hollow interior surface 148, which has a diameter preferably just slightly greater than the diameter of the catheter tube 34, to accommodate axial displacement of the catheter tube 34 through the cylindrical hollow interior 148. The wall 144 terminates in a rounded distal tip 150. The diameter of the exterior cylindrical surface 146 is preferably just slightly greater than the diameter defined by surface 134 of boss 128 so that, when the exposed distal portion 136 is inserted into the opening defined by surface 134, an air-tight, interference-fit relationship will be established such that fitting 100 remains in the assembled position against inadvertent separation. When a permanent union is desired, contiguous surfaces 134 and 146 may be bonded together.

Exposed distal portion 136, in its presently preferred configuration illustrated in FIGS. 5 and 6, is molded as one piece from rigid synthetic resinous material of a suitable medical grade. Distal portion 136 comprises a side port 152 in the form of a transversely-directed cylindrical wall 154 in the form or configuration of a boss or annular projection. Boss 154 comprises an internal hollow passageway 156 which unobstructively merges with passageway or axial bore 148. Bore 156 is stepped to form shoulder 158 against which the proximal end of a wash supply tube 160 is seated and adhesively secured. Wash supply tube 160 comprises a hollow interior passageway 162 aligned with passageway 156. Tube 160 is capped at the distal end fitting 174 164 by a press-fit female lid 166. Lid 166 is tethered at 168 to fitting 164 so that the lid 166 does not become lost when it is selectively removed for delivery of wash solution by which the exterior of the catheter tube 34 is washed as it is removed from the respiratory system of a medical patient. This procedure is described in greater detail in U.S. Pat. No. 4,569,344.

Wall 144 is stepped at 174 to thereby enlarge the thickness of the wall without changing the size of passageway 148. Wall 144 integrally joins proximal radially-extending flange 176. Flange 176 is essentially disk-shaped and comprises a blunt peripheral edge 178, the diameter of which is of a predetermined amount. Flange 176 also comprises a front surface 180 and a rear surface 182. Surface 182 is, as illustrated in FIG. 5, contiguous with elastomeric disk 138.

Disk or washer 138 is preferably formed of a suitable elastomeric material such as neoprene or polyurethane and comprises a front face 184, a rear face 186, a blunt peripheral edge 188 and a central bore 190 of predetermined diameter. The diameter of edge 188 is preferably substantially the same as the diameter of edge 178. The diameter of the bore 190 is aligned with but slightly less than the diameter of the bore 148 and also slightly less than the diameter of the catheter tube 34. Thus, as the catheter tube is axially displaced through the bore 190, its exterior surface is wiped by a slightly compressive relationship between the exterior surface of the catheter tube 34 and the annular surface of the washer 138 defining bore 190. The engagement of the washer with the exterior of the catheter tube also prevents flow of ventilating gas from the elbow 211 through the fitting 100.

Internal proximal portion 142 of the fitting 100 is also preferably formed as one piece through injection molding procedures using rigid synthetic resinous material of a medical grade and comprises an elongated, rearwardly-directed, bore-defining cylindrical wall 192, which is illustrated as being of uniform thickness comprising interior cylindrical surface 194, exterior cylindrical surface 196 and blunt exposed proximal edge 198. The length of interior proximal portion 132 may be selected so that edge 198 is radially disposed adjacent the trailing edge of exterior housing 140, as illustrated in FIG. 5.

The distal end of proximal portion 142 comprises a disk-shaped flange 200 through which the bore defined by surface 192 passes and which comprises a distal surface 201, a proximal surface 202 and a blunt edge surface 203, the diameter of which is illustrated as being the same as the diameter of flange 178. Integral with both the cylindrical wall 192 and the flange 200 are a plurality of planar, radially-directed reinforcing walls or spokes 204, illustrated as being of uniform thickness, respectively, and extending radially a distance equal to the radius of the flange 200. Specifically, proximal portion 142 comprises four reinforcing walls 204 spaced at 90-degree intervals in respect to each other for purposes of supporting and reinforcing the exterior housing 140 of the fitting 100. As can be seen from FIG. 5, the diameter of the bore defined by surface 194 is illustrated as being equal to the bore defined by surface 148.

Exterior housing 140 essentially comprises a stepped hollow cylinder, the thickness of which is illustrated as being uniform. The exterior housing 140 comprises a cylindrical wall 205, which is stepped at 206. The step or shoulder portion 206 is configurated so as to be contiguous with a portion of the reinforcing walls 204, as can best be seen in FIG. 5. The portion of wall 205 located proximal of shoulder 206 is spaced annually from cylindrical wall 192. The enlarged portion of wall 205 located distally from shoulder 206 is centrally notched at 207 to contiguously receive the previously described boss 154.

The enlarged portion of wall 205 comprises an interior surface 208, the diameter of which is substantially the same as the diameters of flanges 178 and 200. Thus, edges 178 and 203 are contiguous with surface 208 as is the outer edge of each reinforcing wall 204. Preferably a suitable adhesive is interposed between surface 208 and each of the edges 178 and 203 as well as the outer edges of each reinforcing wall 204 to secure the fitting 100 in its assembled position illustrated in FIG. 5. It should be apparent that exterior housing 140 is assembled last and such assembly is accomplished by displacement of the exterior housing 140 along the catheter tube 34 in a distal direction until the position of FIG. 5 is obtained and secured as by welding, bonding or the like.

Just slightly forward of proximal edge 215 is an annular rib 217 which is received in press-fit relation into an annular groove and collar 32 for retention of collar 32 in substantially the same way as annular rib 278 receives and secures collar 280 as hereinafter more fully explained.

Specific reference is now made to FIGS. 7–10, which illustrate the proximal end of the apparatus 20, which comprises observation chamber 270 interposed in the suction catheter tube flow path between the trailing end of the envelope 36 of apparatus 30 and suction control valve 40.

Figure 7:
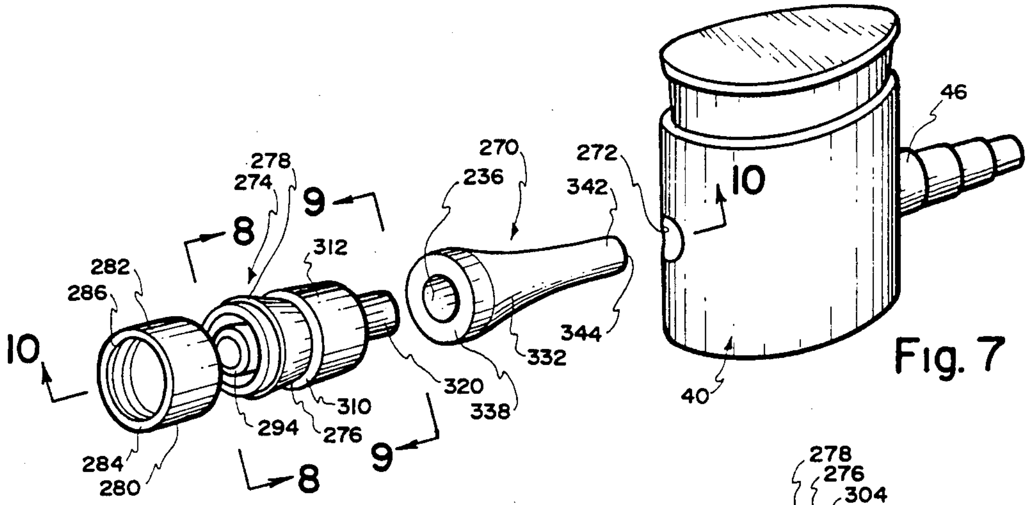
FIG. 7 is an exploded perspective of the proximal end of the embodiment illustrated in FIG. 1.
Figure 8:
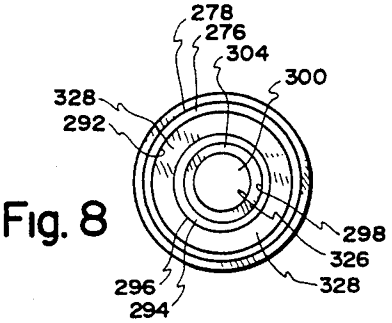
FIG. 8 is a cross-section taken along the lines 8—8 of FIG. 7.
Figure 10:
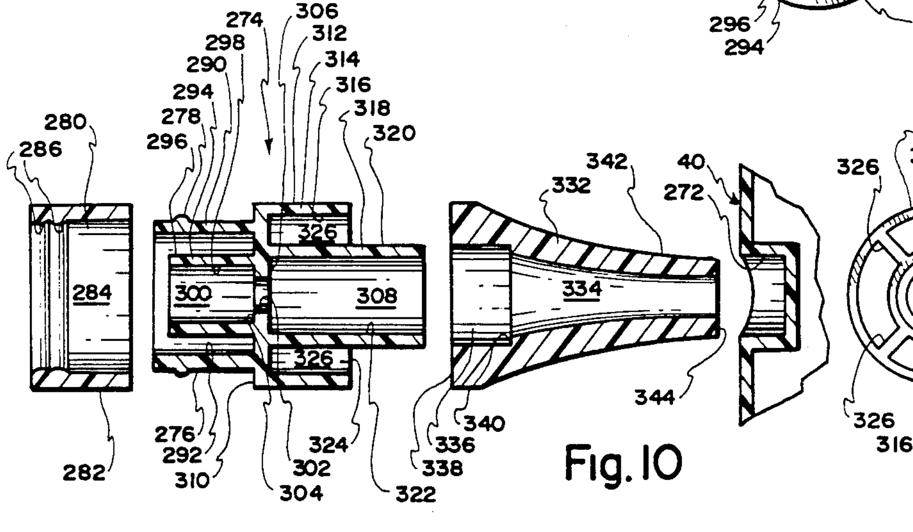
FIG. 10 is an end view taken along lines 10—10 of FIG. 7.
Figure 9:
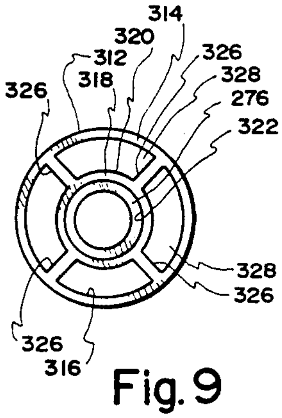
FIG. 9 is an end view taken along lines 9—9 of FIG. 7.

The observation chamber 270 is disclosed in U.S. Pat. No. 4,838,255. The suction control valve 40 is disclosed in the U.S. Pat. No. 4,569,344. Control valve 40, as best illustrated in FIG. 7, comprises a female recess 272 sized and shaped for appropriate fluid communication connection to the secretion observation chamber 270. The apparatus 30 comprises the heretofore described, collapsible envelope 36, suction catheter 34 and connector 44, integrally joined to the trailing end of the catheter tube 34. The fitting 44 integrally joins a fitting, generally designated 274. The fitting 274 comprises a forwardly projecting extension 276 which comprises the cylindrical exterior of predetermined diameter interrupted by an annular radially extending rib 278. The envelope 36, at the trailing end thereof, is collapsed into contiguous relation with the cylindrical surface 276, with a collar 280 disposed in surrounding relation to the envelope 36 but forwardly offset from the surface 276.

The collar 280 is annular in its configuration defining a cylindrical exterior surface 282 having a diameter slightly larger than the diameter of the cylindrical surface 276 of the fitting 274. The internal surface 284 of the collar 280 is interrupted by spaced ribs 286. The diameter of the surface 284 and the annular ribs 286, which project radially inwardly, are sized and shaped so that forced advancement of the collar 280 over the trailing end of the envelope 36 into superposition with the cylindrical surface 276 creates a force-fit connection between the fitting 274 and the trailing end of the envelope 36 between ribs 286 and 278. The cylindrical surface 276 of the fitting 274 comprises part of an annular wall 290 (FIG. 10) which also defines an annular interior wall surface 292.

Concentric with the wall 290 is a wall 294, illustrated as having uniform thickness defining an exterior cylindrical surface 296 and an interior cylindrical surface 298. The fitting 44 integrally carried at the trailing end of the suction catheter tube 34 is sized and shaped to snugly fit within wall 294 at surface 298 where it is adhesively or otherwise stationarily secured against inadvertent separation. Thus, the hollow bore at 300 is placed in direct fluid communication with the hollow interior of the suction catheter tube 34.

The fitting is illustrated as comprising a construction at orifice at 302, which comprises a forward should 304 and a larger rearwardly directed shoulder 306. Thus, the central bore is enlarged at bore 308 which is disposed at the trailing end of the fitting 274.

The exterior cylindrical surface 276 merges at shoulder 310 with an exterior cylindrical surface 312 of larger diameter. The cylindrical surface 312 comprises wall 314 which is of uniform thickness and defines also an internal cylindrical or annular surface 316. Shoulder 306 merges with an annular projection 318, which comprises an exterior cylindrical surface 320 and an interior cylindrical surface 322. Cylindrical surface 322 defines the enlarged bore section 308. The diameter of the exterior surface 320 is substantially smaller than the diameter of the cylindrical surface 316 thereby defining an annular recess 324 therebetween. Radial strengthening ribs 326 span between the walls 314 and 318 to provide strength and stability.

The observation chamber 270 is tubular and has a funnel shape. Thus, the observation chamber 270 is both interiorly and exteriorly tapered. Observation chamber 270 comprises a length of transparent tubing of the mentioned tapered configuration 332. The tubing 332 is centrally hollow, defining a central bore 334, which has a diverging configuration from left to right. The wall 332 is of substantially uniform thickness throughout, with the exception that a cylindrical seat 336 is defined at the larger leading end at the interior thereof. The cylindrical seat 336 extends from the blunt leading edge 338 of the tubing 332 to an interior annular shoulder 340. The diameter of the annular seat 336 is substantially the same as the diameter of the cylindrical surface 320 of the fitting 274. Thus, by placing a suitable bonding agent or adhesive between the rearward portion of surface 320 and/or the surface defining the seat 336, joining of the fitting at projection 318 with the tapered tubing 332 is made permanent and inseparable.

The observation chamber 270 comprising tube 332 is transparent, preferably formed of acrylic of medical grade. The taper of the bore 334 provides for initial introduction of the secretions withdrawn from the lungs of a patient through the suction catheter tube 34 to flow slowly into the observation chamber 270 and more rapidly thereafter for accurate visual observation of the rate of flow of the secretions, the approximate quantity of the flow, as well as the color, texture and other characteristics of the secretions. The wall 332, at the trailing end, defines a cylindrical surface 342, which terminates in a blunt transverse edge 344. The diameter of the surface 342 is selected to be substantially the same as the diameter of the recess 272 in the suction control valve 40 so that a bonding agent may be interposed between the two and the two interposed in contiguous relation to create a permanent union therebetween.

The flexible envelope 36 is selectively attachable and detachable at each end, allowing ready manual manipulation of the catheter tube 34 by gripping action on the part of the user applied to the exterior of the envelope 36. The catheter tube 34 is preferably controlled solely by manual manipulation thereof through the envelope.

The flexible envelope 36 is held by an interference fit at the opposite ends thereof using collars 32 and 282, respectively. See FIG. 1. The interference fit couplings 32 and 282 together with an aspirating vacuum controlled valve 40, the adaptor 210 and the observation chamber 270 are illustrated as being known components. These components are described in substantial detail in U.S. Pat. Nos. 4,569,344 and 4,838,255, the contents of which are incorporated herein by reference for purposes of simplifying this detailed description. It should be noted, however, that the aspirating lumen 35 of the catheter tube 34 is in fluid communication with the distal side of the valve 40. The proximal side of the valve 40 in turn is in fluid communication via line 41 with a vacuum source 42, such as a conventional hospital suction system. A pressure and flow rate monitor 45 is illustrated as being connected to line 41 via line 47.

In short, when the catheter tube 34 is in the appropriate position in the lung of a medical patient, the valve 40 is manually actuated so that the vacuum of source 42 is applied to the aspirating lumen 35 of the catheter tube 34 thereby causing undesired secretion accumulated in the lung to enter the catheter tube through the tip opening or influent port 43 and to flow along the lumen 35 of the catheter tube 34.

The invention may be embodied in other specific forms without department from the spirit or essential characteristics thereof. The present embodiment is, therefore, to be considered in all respects as illustrative and not restrictive, the scope of the invention being indicated by the appended claims rather than be the foregoing description, and all changes which come within the meaning and range of equivalence of the claims are therefore to be embraced therein.

What is claimed and desired to be secured by United States Letters Patent is:

1. A method of producing a closed system aspirating and ventilating apparatus by which the risk of premature interruption in any ventilating interval is alleviated, comprising the steps of:

providing a hollow elbow ventilating fitting comprising a wall having only one relatively large distal port, one relatively large side port oppositely aligned with a closed part of the wall and one relatively small hole in the wall in general alignment with the distal port;

providing aspirating structure comprising an aspirating catheter tube and a forward hollow male fitting tightly surrounding the catheter tube at a distal end of a bore in the male fitting the catheter tube being contiguously manually selectively advanced and retracted in respect to the male fitting;

inserting the hollow male fitting into the small hole in the wall in air-tight telescopic relation against inadvertent separation and so that said catheter tube advancement and retraction contiguously with the distal end of the bore concentrically within the hole in the wall is accommodated while passage of ventilating gas into the bore is prevented and the space for ventilating gases within the hollow elbow is not substantially increased by the combination of the hollow male fitting and the contiguous advancing and retracting path of the catheter tube.

2. A method according to claim 1 wherein passage of ventilating gas passage through the bore of the inserted hollow male fitting is prevented at least in part by engagement between resilient means and the exterior of the catheter tube at a site proximal of the hole in the wall.

3. A method according to claim 2 further comprising the step of wiping the exterior of the catheter tube by frictional engagement between the resilient means and the catheter tube during retraction of the catheter tube.

4. A method according to claim 1 further comprising the step of adhesively securing the hollow male fitting within the hole in the wall in said telescopic relation.

5. Aspirating and ventilating closed system apparatus comprising:

an aspirating catheter tube;

fitting means comprising:

hollow first connector means by which the apparatus is distally connected to an exposed proximal end of a respiratory tube;

intermediate hollow connector consisting essentially of an L-shaped influent and effluent ventilating passageway, the L-shaped ventilating passageway comprising all of the space of the connector and being defined by (a) (one distal hollow ventilating barrel wall) contiguous with the hollow first connector means through which the catheter tube selectively passes, and (b) (one transversely directed hollow ventilating barrel wall) adapted to receive oxygenating gas from a source and deliver said gas to the hollow of the distal barrel wall and from thence through the hollow of the first connector and the hollow of the endotracheal tube to the respiratory system of a patient, the one distal barrel wall merging through 90° with the one transversely directed barrel wall, the one transversely directed barrel wall defining relatively (small proximal port means) in axial alignment with the hollow of the first connector means;

(proximal fitting means) comprising a male leading end joined in male/female relation to said proximal port means so that the space for ventilating gas of the L-shaped ventilating passageway is not materially changed, the proximal fitting means further comprising a hollow interior sized and shaped to accommodate snug reciprocal passage of the catheter tube therethrough to the distal end of the proximal fitting means at the proximal port means enroute to and from the respiratory system.

6. A closed system aspirating and ventilating apparatus for respiratory therapy comprising:

distally disposed fitting means comprising wall means defining an L-shaped influent and effluent ventilating passageway, the L-shaped ventilating passageway comprising substantially all of the space for ventilating gases of the fitting means and being defined by first wall means defining one relatively large distal chamber accommodating both ventilation and aspiration, second wall means defining one relatively large transversely directed chamber accommodating only ventilation and one relatively small proximal port disposed in the second wall means in axial alignment with the distal chamber defining no space for ventilating gases and accommodating aspiration only;

aspiration assembly means, comprising an aspirating catheter tube, disposed proximal of the distally-disposed fitting means, the aspiration assembly comprising male union means snugly inserted into the proximal port and comprising means providing a snug passageway for contiguous delivery and withdrawal of the catheter tube into and from the respiration system through said male union means at the proximal port and into the large distal chamber.

7. A closed system aspirating and ventilating apparatus according to claim 6 further comprising internal seal means disposed proximal of the male union means which (1) assists in preventing passage of ventilating air through the aspiration assembly and (b) wipes the exterior of the catheter tube during withdrawal thereof.

8. A closed system aspirating and ventilating apparatus according to claim 7 wherein the internal seal means comprises an elastomeric washer which compressively engages the exterior of the catheter tube.

9. A closed system aspirating and ventilating apparatus according to claim 6 wherein the catheter tube in its retracted position is substantially disposed within a collapsible envelope through which the catheter tube is manually manipulated.

10. A closed system aspirating and ventilating apparatus according to claim 9 wherein the collapsible envelope is secured to the union means by releasible means.

11. A closed system aspirating and ventilating apparatus according to claim 10 wherein the releasible means comprise force-fit collar means.

12. A closed system aspirating and ventilating apparatus according to claim 6 further comprising vacuum valve means disposed at the proximal end of the catheter tube.

13. A closed system aspirating and ventilating apparatus according to claim 6 further comprising catheter tube flow observation chamber means associated with the catheter tube.

14. A closed system aspirating and ventilating apparatus according to claim 6 further comprising adapter means associated with the first wall means by which the apparatus is releasibly connected to an indwelling endotracheal tube.

15. A closed system aspirating and ventilating apparatus according to claim 14 wherein the adapter means comprises liquid port means by which a liquid is selectively introduced into a patient's respiratory system.

16. A closed system aspirating and ventilating apparatus according to claim 6 wherein the male union means comprises wash port means by which solution is introduced to wash the exterior of the catheter tube during withdrawal.

17. A closed system aspirating and ventilating apparatus for respiratory therapy comprising:

distally disposed, generally L-shaped hollow fitting means comprising wall means defining an L-shaped ventilating flow path the wall means comprising first axial wall means defining one relatively large distal chamber accommodating both ventilation and aspiration, and second transverse wall means defining one relatively large side chamber accommodating only ventilation, a relatively small proximal port without space for ventilating gases and accommodating aspiration only being disposed in the second transverse wall;

aspiration assembly means, comprising an aspirating catheter tube, disposed proximal of the distally-disposed fitting means, the aspiration assembly comprising male union means tightly placed in the proximal port and comprising means providing an air-tight, liquid-tight passageway substantially to the distal end of the male union means by which delivery and withdrawal of the catheter tube into and from the respiration system is achieved.

* * * * *